July 26, 1927.
W. H. COLES
1,637,140
LAWN SPRINKLER
Filed July 16, 1923
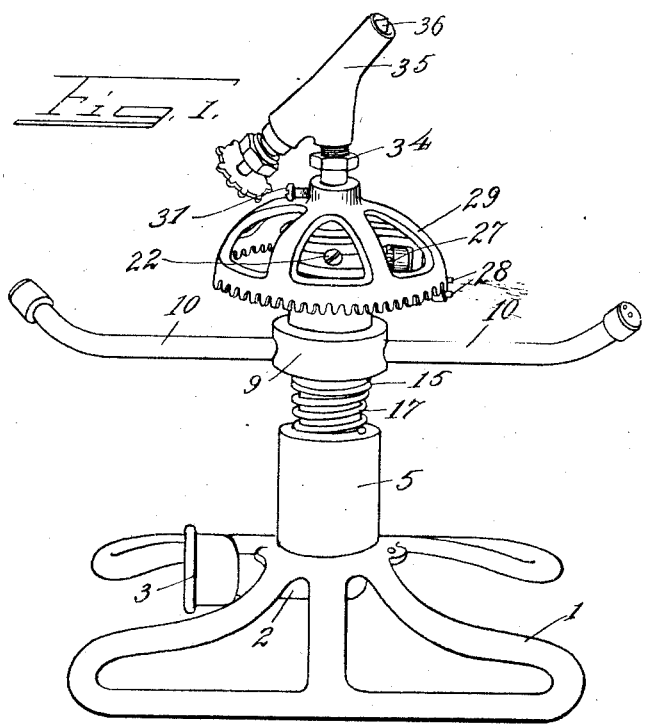
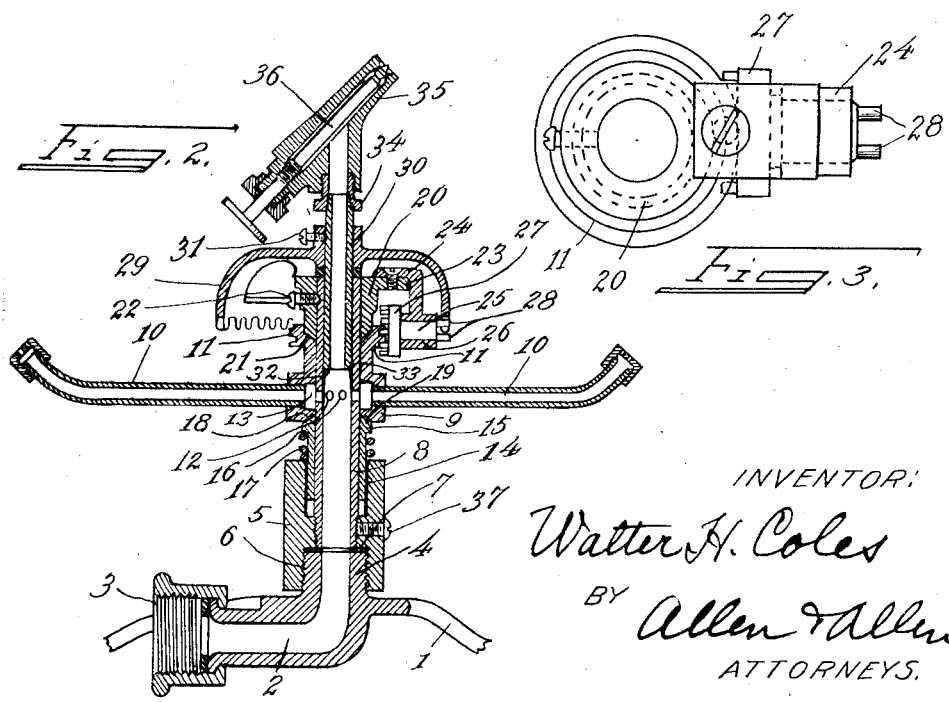
INVENTOR:
Walter H. Coles
BY Allen & Allen
ATTORNEYS.

Patented July 26, 1927.

1,637,140

UNITED STATES PATENT OFFICE.

WALTER H. COLES, OF TROY, OHIO, ASSIGNOR TO THE SKINNER IRRIGATION COMPANY, OF TROY, OHIO, A CORPORATION OF OHIO.

LAWN SPRINKLER.

Application filed July 16, 1923. Serial No. 651,806.

My invention relates to that type of lawn sprinklers wherein revolving lateral sprayers are caused to rotate by means of the pressure and force of flow of the water passing through channels curved in the direction opposite to that in which it is desired to rotate the sprayers, and wherein by means of a suitable gear mechanism, as hereinafter described, a central fountain spray, pointed at a slight angle from the perpendicular, is caused to rotate at a much slower speed.

Heretofore the bearing surfaces of the rotating lateral sprayers were not adjustable to the pressure of the water and as to their desired speed, thus permitting leakage of water at high water pressure, and on the other hand when packed too tightly, resulting in complete stoppage of the operative mechanism under low pressure.

Thus when the bearings on former sprinklers are sufficiently loose to permit rotation under low pressure, they have been found to leak badly when operating under higher pressure.

My object is to provide among other advantages of improved construction, bearings for these lateral sprayers, that are leakproof under any pressure and easily adjustable to any desired speed of rotation, of simple construction and with a minimum of parts subject to wear.

In the accompanying drawings:

Figure 1 is a perspective view of my complete device.

Figure 2 is a vertical section through the axis of the device.

Figure 3 is a plan view of the upper bearing collar with attached bracket in which the pinion shaft is journaled.

Referring now to the drawings in detail: The base 1, has a suitable water passage 2, cast into its structure, which is provided with the usual swivel hose connection 3, and extends above the base in a threaded nipple 4. A sleeve 5 is threaded at 6 to receive the nipple 4, is contracted by an internal shoulder at 7, and threaded to receive the axial tube 8, upon which the hub 9, bearing the lateral sprayer arms 10 and 10, and the worm 11 is journaled. The tubular axis 8, is provided with openings 12, which register with a water passage 13, supplying water to the sprayers 10, 10.

The sleeve 5, has an enlarged internal portion 14, to receive the movable bearing cone 15, said cone has a shoulder 16, between which and the upper edge of the sleeve 5, a helical coil spring 17, is inserted.

The bearing surface 18 of the cone 15 operates in a seat 19 in the hub 9, to form a leak-proof joint, the spring 17 exerting pressure against the shoulder 16 of the cone 15 to hold it in contact with the seat 19 under pressure.

An upper fixed bearing cone 20, is inserted in a seat 21 in the upper portion of the hub 9 and fixed by a set screw 22 to the axial tube 8. The upper portion of the bearing cone 20 has an arm 23 upon which a bracket 24 is so attached that its center is in eccentric relation to the center of the bearing cone 20. A shaft 25, journaled in a bearing 26, in the bracket 24, has a toothed wheel 27 upon its inner end, the teeth on one side of which are in mesh with the worm 11 upon the hub 9.

The above arrangement, having the center of rotation of the shaft 25 in eccentric relation to that of the worm 11, prevents teeth on opposite sides of the wheel 27 from coming in contact with the worm 11 simultaneously.

The outer end of the shaft 25 has two teeth 28, upon it, which mesh alternately with the cogs of the cupped spur gear 29, said spur gear being fixed to a rotatable axial tube 30 by the set screw 31. The axial tube 30 is telescoped within the axial tube 8 and a shoulder 32 at its lower end is in contact with a corresponding shoulder 33 in the axial tube 8, thus forming a rotatable seat, closing with the upward pressure of the water passing through the tubes, preventing leakage and at the same time allowing freedom of rotation of the parts.

Secured to the upper end of the tube 30, by means of the packing nut 34, is a fountain spray nozzle 35, set at an appropriate angle and provided with an adjustable needle valve 36 to regulate the quality of the spray desired.

In practical operation the rotation of the lateral sprayers is produced by the force of the water rushing through the passages provided for it and out through the sprayer arms 10, thus imparting rotary movement to the hub 9 and worm 11.

The speed of rotation of these arms is regulated by loosening the set screw 37 in the sleeve 5, and giving the sleeve a few turns or a fraction of a turn as necessary while holding the cupped spur gear 29 against the rotation. A clockwise turn will cause the axial tube 8 to be screwed out of the sleeve 5, thus releasing the tension of the spring 17 and the consequent pressure between the lower bearing surfaces, thereby lessening the braking influence of the friction at several bearing surfaces of the two cones and the hub 9, and allowing greater speed of rotation. A counterclockwise turn will, however, have an opposite effect, and by exerting pressure of the cones against the hub 9 tend to retard the rotation of the sprayer arms.

Rotation of the worm 11, imparts a rotary movement through the toothed wheel 27 to the shaft 25, the teeth 28 on which falling in mesh with the cogs on the spur gear 29, impart rotary movement to it and to the axial tube 30 and the fountain spray 35.

Having thus described my invention, what I claim as new and desire to secure by Letters Patent, is:—

1. In a lawn sprinkler, an axial tube capable of conveying water, rotatable sprayer members journaled on said tube and receiving water therefrom, the sprayer members being rotated by means of water pressure so conveyed, an adjustable sleeve member on said axial tube, a spring member under tension actuated by said sleeve member, a movable bearing member receiving resistance energy from the tension of said spring, a hub member on said tube and carrying the sprayers and having a bearing surface in contact with said movable bearing member, a fixed bearing member in contact with an opposite bearing surface on said hub member, said hub member being rotatable between said fixed and movable bearing members, tension between all these bearing surfaces being adjustable by means of said sleeve member to prevent leakage of water between these members under varying pressure and also to regulate the speed of rotation of said sprayer members under varying water pressure, for the purpose described.

2. In a lawn sprinkler, an axial tube capable of conveying water, rotatable sprayer members journaled thereon and receiving water from said tube, said sprayer members being rotated by means of the pressure of the water so conveyed, adjustable bearing members operating under tension, a spring member exerting such tension, a means for adjusting the tension of such spring member, a hub member carrying said sprayers and rotatable on the axial tube, and between said bearing members, a worm member upon said hub and rotating in like plane, a pinion and gear mechanism rotated by said worm, and a fountain spray nozzle directed at a suitable angle and rotated by said gear mechanism, all substantially as described.

WALTER H. COLES.